United States Patent
Wang et al.

(10) Patent No.: US 10,742,466 B2
(45) Date of Patent: Aug. 11, 2020

(54) WIRELESS COMMUNICATION DEVICE AND WIRELESS COMMUNICATION METHOD

(71) Applicant: Panasonic Intellectual Property Corporation of America, Torrance, CA (US)

(72) Inventors: Lilei Wang, Beijing (CN); Ayako Horiuchi, Kanagawa (JP); Alexander Golitschek Edler Von Elbwart, Hessen (DE); Masayuki Hoshino, Chiba (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/086,543

(22) PCT Filed: Mar. 30, 2016

(86) PCT No.: PCT/CN2016/077874
§ 371 (c)(1),
(2) Date: Sep. 19, 2018

(87) PCT Pub. No.: WO2017/166125
PCT Pub. Date: Oct. 5, 2017

(65) Prior Publication Data
US 2019/0104006 A1   Apr. 4, 2019

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0025* (2013.01); *H04L 5/0051* (2013.01);
(Continued)

(58) Field of Classification Search
CPC ... H04L 5/0035; H04L 5/0048; H04L 5/0082; H04W 72/1268; H04W 72/1284; H04W 72/1289; H04W 74/0808; H04W 74/0816
See application file for complete search history.

(56) References Cited

U.S. PATENT DOCUMENTS

2015/0036609 A1* 2/2015 Kim .................. H04W 56/00
370/329
2015/0333888 A1* 11/2015 Kwak .................. H04L 5/0016
370/329
(Continued)

FOREIGN PATENT DOCUMENTS

WO   2014/015800 A1   1/2014
WO   2017/136079 A1   8/2017

OTHER PUBLICATIONS

R1-156460; "Discussion on DL RS and UL RS for short TTI"; Huawei et al.; 3GPP TSG RAN WG1 Meeting #83 R1-156460 Anaheim, USA, Nov. 15-22, 2015 (Year: 2015).*
(Continued)

*Primary Examiner* — Benjamin H Elliott, IV
(74) *Attorney, Agent, or Firm* — Seed IP Law Group LLP

(57) ABSTRACT

Provided are wireless communication devices and methods. A wireless communication device can comprise: circuitry operative to map at least a first type of reference signals (RSs) onto orthogonal frequency division multiplexing (OFDM) symbol (s) other than the OFDM symbols onto which shortened transmission time intervals (TTIs) are mapped in a subframe, each of the shortened TTIs comprising 1-7 OFDM symbols; and a transmitter operative to transmit a physical channel in one of the shortened TTIs and transmit at least the first type of RSs.

12 Claims, 12 Drawing Sheets

(51) Int. Cl.
*H04W 72/04* (2009.01)
*H04W 72/12* (2009.01)
(52) U.S. Cl.
CPC .......... *H04L 27/26* (2013.01); *H04L 27/2602* (2013.01); *H04L 27/2605* (2013.01); *H04W 72/042* (2013.01); *H04W 72/1205* (2013.01); *H04L 5/0007* (2013.01)

(56) References Cited

U.S. PATENT DOCUMENTS

| | | | |
|---|---|---|---|
| 2015/0349979 A1* | 12/2015 | Ji .................. | H04L 25/0224 370/312 |
| 2017/0149542 A1* | 5/2017 | Lee .................. | H04L 5/0044 |
| 2017/0171842 A1* | 6/2017 | You .................. | H04L 5/0048 |
| 2017/0215206 A1* | 7/2017 | Cheng ............... | H04W 74/0816 |
| 2018/0198588 A1* | 7/2018 | Zhang ............... | H04L 5/0007 |
| 2018/0376495 A1* | 12/2018 | Lee .................. | H04W 72/1289 |
| 2019/0044675 A1* | 2/2019 | Li .................. | H04J 11/0076 |
| 2019/0104006 A1* | 4/2019 | Wang ............... | H04L 5/0025 |

OTHER PUBLICATIONS

R1-160293; "Discussion on DL RS for short TTI"; Huawei et al.; 3GPP TSG RAN WG1 Meeting #84 R1-160293 St Julian's, Malta, Feb. 15-19, 2016 (Year: 2016).*

R1-160651; "Discussion on DMRS based PDCCH transmission with TTI shortening"; LG; 3GPP TSG RAN WG1 Meeting #84 R1-160651 St Julian's, Malta, Feb. 15-19, 2016 (Year: 2016).*

R1-160699; "Design of UL reference signal for PUSCH with sTTI"; Mitsubishi Electric; 3GPP TSG RAN WG1 Meeting#84 R1-160699 Malta, Feb. 15-19, 2016 (Year: 2016).*

International Search Report of PCT application No. PCT/CN2016/077874 dated Dec. 21, 2016.

The Extended European Search Report dated Feb. 13, 2019 for the related European Patent Application No. 16895906.2.

ZTE: "Uplink DMRS for PUSCH in short TTI", 3GPP Draft; R1-160987 Uplink DMRS for PUSCH in Short TTI, 3rd Generation Partnership Project (3GPP), Mobile Competence Centre; 650, Route Des Lucioles; F-06921 Sophia-Antipolis Cedex; France, vol. RAN WG1, No. St Julian's, Malta; Feb. 15, 2016-Feb. 19, 2016 Feb. 14, 2016 (Feb. 14, 2016), XP051054291, Retrieved from the Internet: URL:http://www.3gpp.org/ftp/Meetings_3GPP_SYNC/RAN1/Docs/ [retrieved on Feb. 14, 2016].

Communication pursuant to Article 94(3) EPC dated Sep. 30, 2019 for the related European Patent Application No. 16895906.2.

Nokia Networks et al: "DMRS for PUSCH with short TTI", 3GPP Draft; R1-160779, Feb. 14, 2016, XP051054106 Retrieved from the Internet: URL:http://www.3gpp.org/ftp/Meetings_3GPP_SYNC/RAN1/Docs/ [retrieved on Feb. 14, 2016].

* cited by examiner

WIRELESS COMMUNICATION DEVICE AND WIRELESS COMMUNICATION METHOD

BACKGROUND

1. Technical Field

The present disclosure relates to the field of wireless communication, and in particular, to wireless communication devices and wireless communication methods related to reference signal design.

2. Description of the Related Art

Latency reduction is a new study item in 3GPP RAN1 and a main assumption is that the transmission time interval (TTI) length can be shortened from 14 orthogonal frequency division multiplexing (OFDM) symbols (1 ms) to 7 or less OFDM symbol(s) to reduce the latency. The TTI whose length is 7 or less OFDM symbol(s) is also referred to a shortened TTI (also abbreviated as sTTI hereafter).

SUMMARY

One non-limiting and exemplary embodiment provides reference signal design with respect to shortened TTIs for latency reduction.

In a first general aspect of the present disclosure, there is provided a wireless communication device comprising: circuitry operative to map at least a first type of reference signals (RSs) onto orthogonal frequency division multiplexing (OFDM) symbol(s) other than the OFDM symbols onto which shortened transmission time intervals (TTIs) are mapped in a subframe, each of the shortened TTIs comprising 1-7 OFDM symbols; and a transmitter operative to transmit a physical channel in one of the shortened TTIs and transmit at least the first type of RSs.

In a second general aspect of the present disclosure, there is provided a wireless communication method comprising: mapping at least a first type of reference signals (RSs) onto orthogonal frequency division multiplexing (OFDM) symbol(s) other than the OFDM symbols onto which shortened transmission time intervals (TTIs) are mapped in a subframe, each of the shortened TTIs comprising 1-7 OFDM symbols; and transmitting a physical channel in one of the shortened TTIs and transmitting at least the first type of RSs.

In a third general aspect of the present disclosure, there is provided a wireless communication device comprising: circuitry operative to map at most one type of reference signals (RSs) from cell-specific reference signals (CRSs) and demodulation reference signals (DMRSs) in each shorten transmission time interval (TTI) in a subframe, each shortened TTI comprising 1-7 orthogonal frequency division multiplexing (OFDM) symbols; and a transmitter operative to transmit a physical channel in a shorten TTI, the RSs within the OFDM symbol(s) of or before the shorten TTI transmitting the physical channel being used to demodulate the physical channel at a receiving side.

In a fourth general aspect of the present disclosure, there is provided a wireless communication method comprising: mapping at most one type of reference signals (RSs) from cell-specific reference signals (CRSs) and demodulation reference signals (DMRSs) in each shorten transmission time interval (TTI) in a subframe, each shortened TTI comprising 1-7 orthogonal frequency division multiplexing (OFDM) symbols; and transmitting a physical channel in a shorten TTI, the RSs within the OFDM symbol(s) of or before the shorten TTI transmitting the physical channel being used to demodulate the physical channel at a receiving side.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
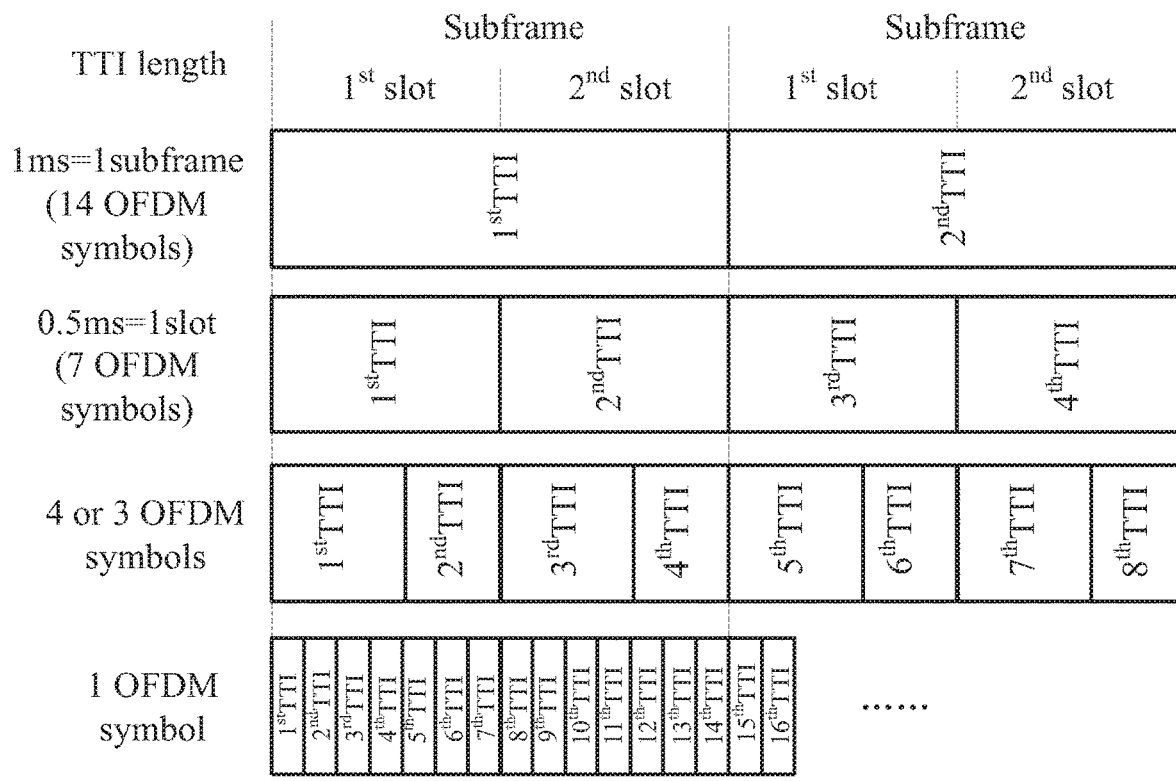
FIG. 1 schematically illustrates some examples of TTI length reduction.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

Latency reduction is a topic in 3GPP RAN1 and a main method is to reduce TTI length for example from 14 OFDM symbols (1 ms) to 1-7 OFDM symbols so that transmission latency can be reduced. In addition, coexistence with legacy UE should be kept so shortened TTI design is still within legacy subframe/frame. FIG. 1 shows some examples of TTI length reduction. In FIG. 1, from the top to the bottom, the first plot shows normal TTIs, that is, the TTI length is one subframe; the second plot shows shortened TTIs whose length is 1 slot (7 OFMD symbols); the third plot shows shortened TTIs whose length is 4 or 3 OFDM symbols (for example, the first and the third TTIs in a subframe have 4 OFDM symbols, and the second and the fourth TTIs have 3 OFDM symbols); the fourth plot shows shortened TTIs whose length is 1 OFDM symbol.

How to design reference signals (RSs) is one of issues related to shortened TTIs. Signaling overhead, performance degradation and latency reduction guarantee can be main factors to consider for RS design.

In an embodiment of the present disclosure, it is proposed to map at least a first type of RSs onto OFDM symbol(s) other than the OFDM symbols onto which shortened TTIs are mapped in a subframe. In other words, at least one type of RSs can be mapped onto resource elements (REs) that are not in the OFDM symbols of shortened TTIs.

Figure 2:
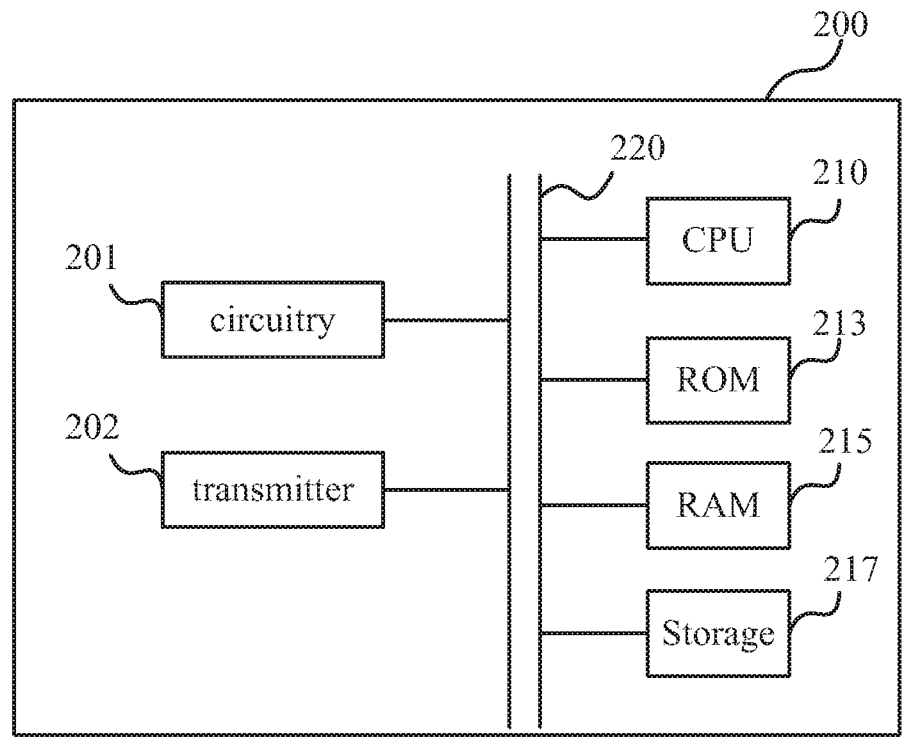
FIG. 2 schematically illustrates a block diagram of a wireless communication device according to an embodiment of the present disclosure.

Accordingly, an embodiment of the present disclosure provides a wireless communication device 200. FIG. 2 schematically illustrates a block diagram of wireless communication device 200 according to an embodiment of the present disclosure. The communication device 200 can comprise: circuitry 201 operative to map at least a first type of RSs onto OFDM symbol(s) other than the OFDM symbols onto which shortened TTIs are mapped in a subframe; and a transmitter 202 operative to transmit a physical channel in one of the shortened TTIs and transmit at least the first type of RSs.

It is noted that the wireless communication device 200 can be an eNode B (eNB) or a user equipment (UE) depending on whether the transmission is downlink transmission or an uplink transmission. In the downlink transmission, the wireless communication 200 can be an eNB or the like, and the first type of RSs can be any RS suitable for downlink, such as DMRS (DeModulation Reference Signal), CSI-RS (Channel Status Information-Reference Signal), CRS (Cell-Specific Reference Signal) and so on. In the uplink transmission, the wireless communication 200 can be a UE or the like, and the first type of RSs can be any RS suitable for uplink, such as DMRS and SRS (Sounding Reference Signal).

The OFDM symbol(s) for the first type of RSs can be located at any position without shortened TTI mapped in the subframe. For example, each shortened TTI can be placed after the OFDM symbol(s) with the first type of RSs associated with said shortened TTI, that is, the first type of RSs are placed earlier than their associated shortened TTI(s). According to this example, since the RSs are detected first, the following shortened TTI(s) can be demodulated successfully based on the information of the detected RSs, thus guaranteeing latency reduction.

The OFDM symbol(s) for the first type of RSs can be one or more OFDM symbols, and if there are multiple OFDM symbols for the first type of RSs, they can be adjacent to each other, or spaced from each other. When they are spaced from each other, the RSs can be closer to their associated shortened TTI(s), and thus the demodulation performance can be improved.

In an embodiment, same OFDM symbol(s) are shared by multiple shortened TTIs to map their associated RSs of the first type. According to this embodiment, not every shortened TTI need separate OFDM symbol(s) to map its associated RSs of the first type; therefore, overhead can be reduced.

In addition, in an embodiment, the position of the OFDM symbol(s) for transmitting the first type of RSs can depend on the length of the PDCCH region in the subframe. For example, if the PDCCH occupies the $1^{st}$ OFDM symbol in a subframe, the OFDM symbol(s) for the first type of RSs can start from the $2^{nd}$ OFDM symbol. If the PDCCH occupies the first two OFDM symbols in the subframe, the OFDM symbol(s) for the first type of RSs can start from the third OFDM symbol in the same subframe.

The wireless communication device 200 also comprises a transmitter 202 as mentioned in the above. The transmitter 202 is operative to transmit the first type of RSs and other RSs if any and also transmit a physical channel in one of the shortened TTIs. The physical channel can be any channel that is suitable to transmit in the shortened TTI, for example, a channel for control information or a channel for data.

In addition, as shown in FIG. 2, the wireless communication device 200 according to the present disclosure may optionally include a CPU (Central Processing Unit) 210 for executing related programs to process various data and control operations of respective units in the wireless communication device 200, a ROM (Read Only Memory) 213 for storing various programs required for performing various process and control by the CPU 210, a RAM (Random Access Memory) 215 for storing intermediate data temporarily produced in the procedure of process and control by the CPU 210, and/or a storage unit 217 for storing various programs, data and so on. The above circuitry 201, and transmitter 202, CPU 210, ROM 213, RAM 215 and/or storage unit 217 etc. may be interconnected via data and/or command bus 220 and transfer signals between one another.

Respective components as described above do not limit the scope of the present disclosure. According to one implementation of the disclosure, the functions of the above circuitry 201 and transmitter 202 may be implemented by hardware, and the above CPU 210, ROM 213, RAM 215 and/or storage unit 217 may not be necessary. Alternatively, the functions of the above circuitry 201 and transmitter 202 may also be implemented by functional software in combination with the above CPU 210, ROM 213, RAM 215 and/or storage unit 217 etc.

Figure 3:
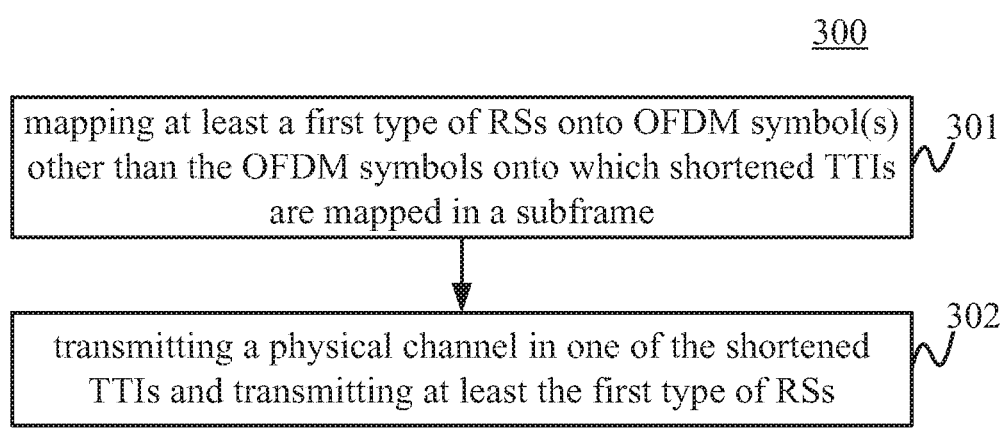
FIG. 3 illustrates a flowchart of a wireless communication method according to an embodiment of the present disclosure.

Corresponding to the above wireless communication device 200, an embodiment of the present disclosure also provide a wireless communication method 300 which can be performed by the wireless communication device 200. FIG. 3 illustrates a flowchart of the wireless communication method 300 according to an embodiment of the present disclosure. The wireless communication method 300 can comprise: a step 301 of mapping at least a first type of RSs onto OFDM symbol(s) other than the OFDM symbols onto which shortened TTIs are mapped in a subframe; and a step 302 of transmitting a physical channel in one of the shortened TTIs and transmitting at least the first type of RSs. It is noted that the description and the benefits of the device 200 can also be applied to the method 300, which will not be repeated here.

Accordingly, at a receiving side, embodiments of the present disclosure provide a wireless communication method and a wireless communication device performing the method at the receiving side. It is noted that, referring to the transmission side, the communication device at the receiving side can also be a UE or an eNB depending on whether the transmission is downlink transmission or an uplink transmission.

Figure 4:
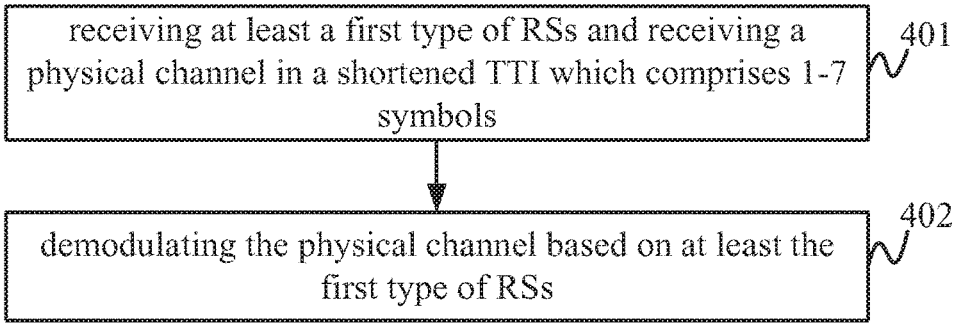
FIG. 4 illustrates a flowchart of a wireless communication method according to an embodiment of the present disclosure.

FIG. 4 illustrates a flowchart of a wireless communication method 400 at the receiving side according to an embodiment of the present disclosure. The method 400 comprises: a step 401 of receiving at least a first type of RSs and receiving a physical channel in a shortened TTI which comprises 1-7 OFDM symbols; and a step 402 of demodulating the physical channel based on at least the first type of RSs, wherein the first type of RSs are mapped onto OFDM symbol(s) onto which no shortened TTIs are mapped. Accordingly, a wireless communication device at the receiving side can comprise: a receiver operative to receive at least a first type of RSs and receive a physical channel in a shortened TTI which comprises 1-7 OFDM symbols; and circuitry operative to demodulate the physical channel based on at least the first type of RSs, wherein the first type of RSs are mapped onto OFDM symbol(s) onto which no shortened TTIs are mapped. It is noted the above details on the transmission side can also be applied to the receiving side unless the context indicates otherwise. In particular, the schematic structure of the wireless communication device at the receiving side can be similar to FIG. 2 except that the transmitter 202 is replaced by the receiver.

In the following, several specific instances related to the above embodiments will be described in detail in order to make the present disclosure be easily understood by those skilled in the art.

Figure 5:
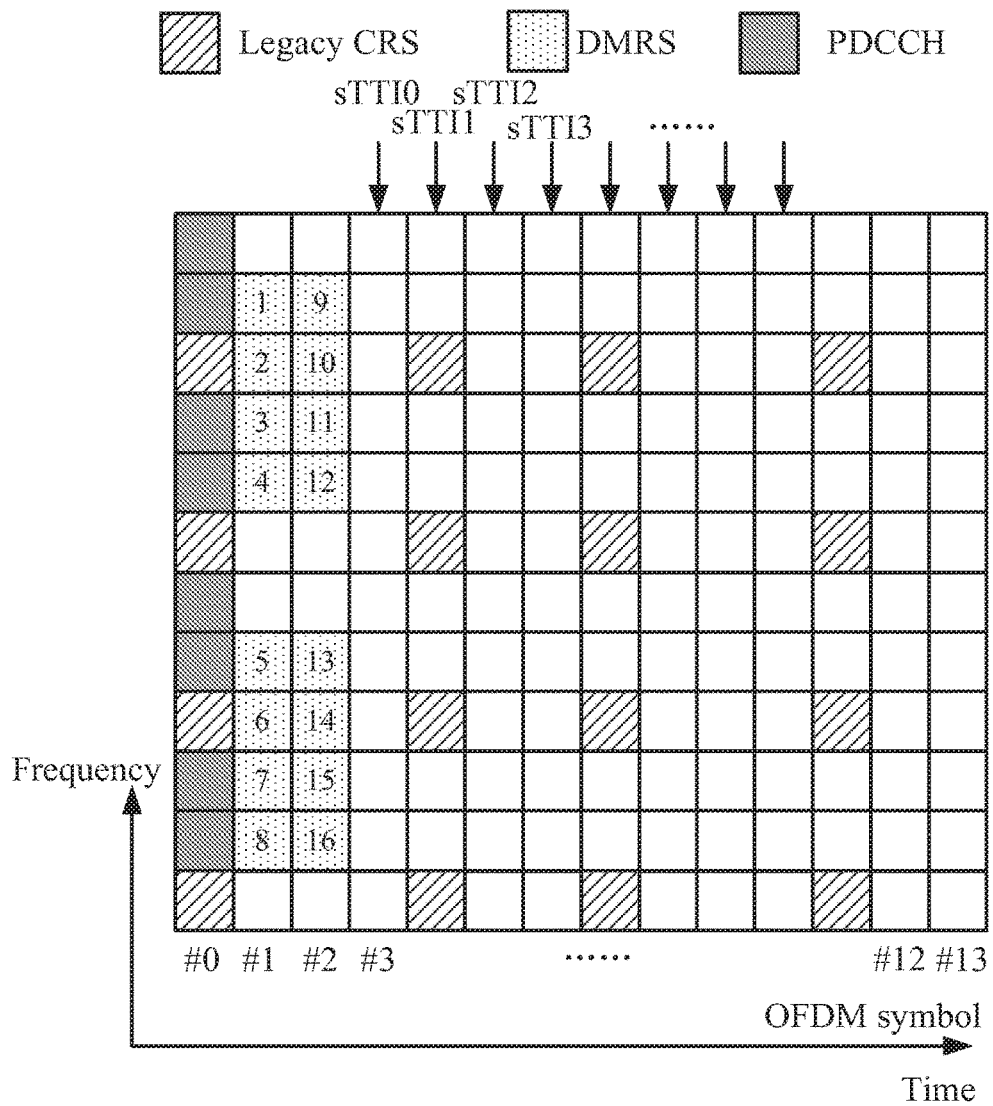
FIG. 5 schematically illustrates an exemplary downlink reference signal design according to an embodiment of the present disclosure.

FIG. 5 schematically illustrates an exemplary downlink reference signal design according to an embodiment of the present disclosure. In this embodiment, it is assumed that the first type of RSs is DMRS, and the length of the shortened TTIs is 1 OFDM symbol. In the subframe shown in FIG. 5, 14 OFDM symbols which are #0 to #13 in sequence are present, OFDM symbol #0 is used for PDCCH (Physical Downlink Control Channel), two CRS ports occupy 16 REs, the DMRSs are mapped onto 16 REs (those REs are denoted as REs 1-16 in FIG. 5) in OFDM symbols #1 and #2 which are not the OFDM symbols for the shortened TTIs, and the OFDM symbols #1 and #2 can be shared by multiple shortened TTIs after the OFDM symbols #1 and #2. Here, OFDM symbols #1 and #2 being shared by multiple shortened TTIs can mean that each shortened TTI has its own DMRSs in respective separate REs in those OFDM symbols. For example, each shortened TTI has two related DMRSs in two separate REs. As shown in FIG. 5, the DMRSs in REs 1 and 5 can be associated with sTTI0, the DMRSs in REs 2 and 6 can be associated with sTTI1, and so on. Alternatively, OFDM symbols #1 and #2 being shared by multiple shortened TTIs can mean that the DMRSs for some or all the shortened TTIs in the subframe can be code division-multiplexed. For example, REs 1 to 8 in combination carries the DMRSs for sTTI0 to sTTI3, and those DMRSs are not separated in frequency domain but are separated in the code domain. Alternatively, OFDM symbols #1 and #2 being shared by multiple shortened TTIs can mean that some or all the shortened TTIs can use the same DMRSs. For example, sTTI0 and sTTI1 can use the same DMRSs mapped onto the REs 1 and 5. According to this embodiment, the average overhead can be reduced, demodulation performance can be improved, and latency reduction gain is kept.

Figures 6, 7:
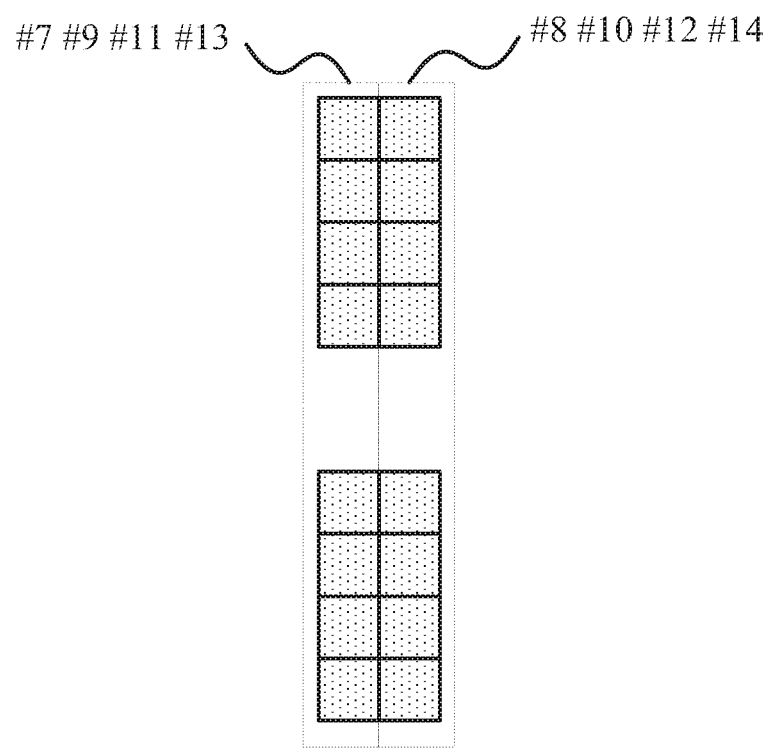
FIG. 6 schematically illustrates occupying positions of DMRS ports in REs according to an embodiment of the present disclosure.
FIG. 7 schematically illustrates occupying positions of DMRS ports in REs according to an embodiment of the present disclosure.

In the embodiment of FIG. 5, the DMRSs in the OFDM symbol(s) shared by the multiple shortened TTIs can be used to multiplex multiple DMRS ports each of which is associated with one or more of the multiple shortened TTIs. For example, assuming 8 DMRS ports (rank 8) are supported, there can be two ways to multiplex those DMRS ports. In a first way, each DMRS port occupies for example two separate REs. FIG. 6 schematically illustrates occupying positions of DMRS ports in REs in an example. FIG. 6 is a cutout from FIG. 5, which depicts the REs which are mapped with DMRSs in FIG. 5, wherein the numbers after "#" represent DMRS port numbers. In the example of FIG. 6, each of DMRS ports #7-#14 occupies two REs, for example, DMRS port #7 occupies REs 1 and 5, DMRS port #8 occupies REs 9 and 13, and so on, as shown in FIGS. 5 and 6. In a second way, several DMRS port can jointly occupy the same multiple REs, and those several DMRS ports are code division-multiplexed in the multiple REs. FIG. 7 schematically illustrates occupying positions of DMRS ports in REs in another example. In the example of FIG. 7, the DMRS ports #7, #9, #11 and #13 are code division-multiplexed rather than frequency division-multiplexed in REs 1-8 in the left OFDM symbol in FIG. 7, and the DMRS ports #8, #10, #12 and #14 are code-division multiplexed in REs 9-16 in the right OFDM symbol in FIG. 7. In both of the above ways, each DMRS port can be associated with one or more shortened TTIs.

In order for a UE to demodulate the physical channel in each shortened TTI, the UE needs to know the position and the usage of the DMRS ports for it. Herein, the position of the DMRS ports means which REs the DMRS ports occupy and how they are multiplexed in those REs, and the usage of the DMRS ports means which shortened TTI is associated with which DMRS port. In one example, the position and/or the usage of the DMRS ports can be indicated in downlink channel information (DCI) transmitted in the PDCCH. In this example, the configuration of DMRS ports is flexible, and several UEs can share the same DMRSs. It is noted that the position or the usage which is not indicated by the DCI in this example can be fixed by specification or configured by the medium access control (MAC) or radio resource control (RRC) layer. In another example, the position and the usage of the DMRS ports can be fixed by specification or configured by the MAC or RRC layer. In this embodiment, the DCI can be transmitted in the PDCCH or in a shortened TTI, and the overhead is reduced. According to this example, there should be a mapping between DMRS ports and the shortened TTIs to be demodulated. For example, port #7 is associated with sTTI0, port #8 is associated with sTTI1, and so on. In yet another example, the position of the DMRS ports can be fixed by specification or configured by the MAC or RRC layer, DCI can be transmitted in a shortened TTI whose associated DMRS port is fixed by specification or configured by MAC or RRC layer, and the usage of the DMRS ports other than the DMRS port that is associated with the DCI is indicated in the DCI. In this example, only the DMRS port for the shortened TTI of the DCI is fixed or configured in advance, and the usage of the other DMRS ports can be indicated in the DCI. Therefore, it balances flexibility and overhead.

Figure 8:
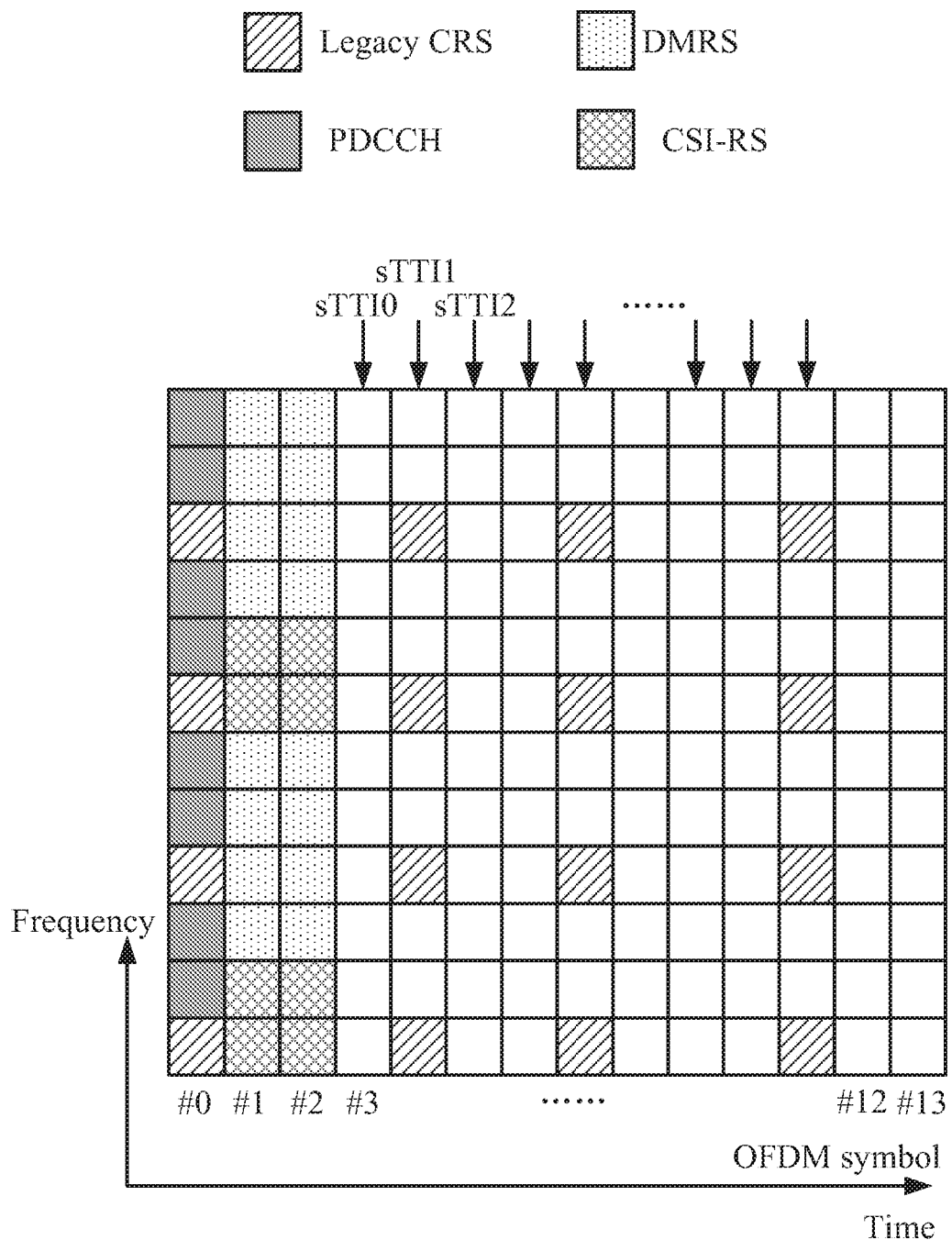
FIG. 8 schematically illustrates an exemplary downlink reference signal design according to an embodiment of the present disclosure.

In another embodiment, a second type of RSs which are CSI-RSs can be mapped onto the same OFDM symbol(s) as the DMRSs. FIG. 8 schematically illustrates an exemplary downlink reference signal design according to the embodiment of the present disclosure. The example shown in FIG. 8 is similar to the example shown in FIG. 5 except that CSI-RSs are considered and they are mapped onto the same OFDM symbols as DMRSs. In such a way, CSI-RS overhead is saved. As an alternative to FIG. 8, the CSI-RSs for the shortened TTIs can also be located in the last one or two OFDM symbols in the subframe, which avoids impact on normal data transmission in the shortened TTIs.

Figure 9:
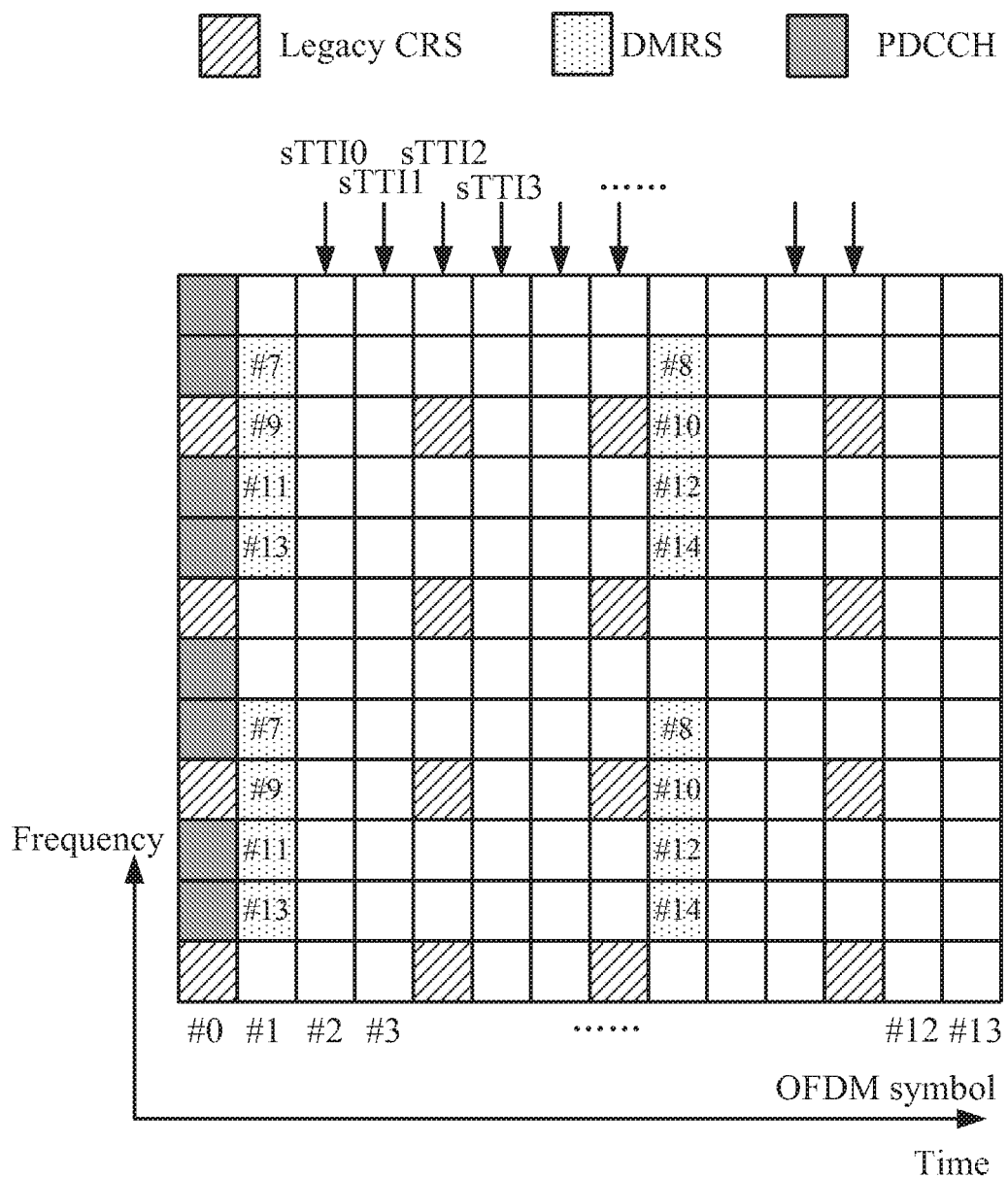
FIG. 9 schematically illustrates an exemplary downlink reference signal design according to an embodiment of the present disclosure.

In the embodiments shown in FIG. 5 and FIG. 8, the two OFDM symbols for DMRSs are adjacent to each other. In another embodiment, the OFDM symbols for DMRSs are spaced from each other such that the DMRSs are closer to the shortened TTIs to be demodulated. FIG. 9 schematically illustrates an exemplary downlink reference signal design according to this embodiment of the present disclosure. In this embodiment, the length of the shortened TTIs is also assumed to be 1 OFDM symbol, but the DMRSs are mapped onto OFDM symbols #1 and #8 respectively. The DMRSs in the OFDM symbol #1 can be associated with the shortened TTIs following the OFDM symbol #1 but earlier than the OFDM symbol #8, and the DMRSs in the OFDM symbol #8 can be associated with the shortened TTIs following the OFDM symbol #8. Therefore, the shortened TTIs to be demodulated are closer to their associated DMRSs, and thus demodulation performance can be improved in addition to reduced averaged overhead and guaranteed latency reduction gain. In addition, in the embodiment, the DMRSs in the OFDM symbol #1 or #8 shared by the multiple shortened TTIs can also be used to multiplex multiple DMRS ports. For example, assuming rank 4 is supported, DMRS ports #7, #9, #11 and #13 are located in the OFDM symbol #1 and used for the shortened TTIs in OFDM symbols #2-#7, and DMRS ports #8, #10, #12 and #14 are located in the OFDM symbol #8 and used for the shortened TTIs in OFDM symbols #9-#13.

In the above, several embodiments relating to downlink are described, and in the following, embodiments relating to uplink will be described. It is noted that the details described for the downlink may be applied to the uplink unless the context indicates otherwise, and vice verse.

Figure 10:
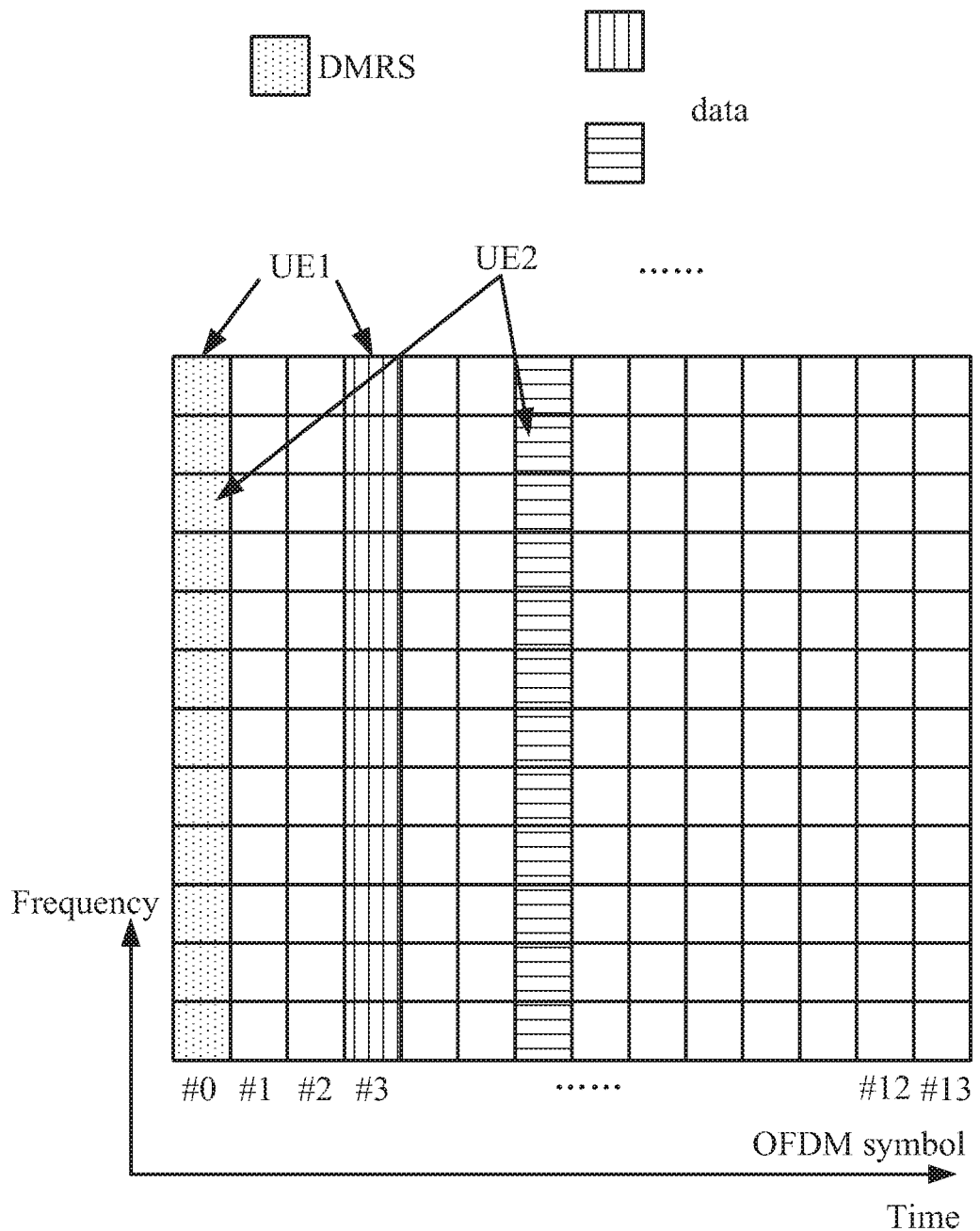
FIG. 10 schematically illustrates an exemplary uplink reference signal design according to an embodiment of the present disclosure.

FIG. 10 schematically illustrates an exemplary uplink reference signal design according to an embodiment of the present disclosure. In this embodiment, the first type of RSs (DMRSs in this embodiment) are always mapped onto the start OFDM symbol (#0) of the subframe. Therefore, different UEs can share the same OFDM symbol for the DMRSs. For example, as shown in FIG. 10, a first UE can transmit DMRSs in OFDM symbol #0 and data in OFDM symbol #3, and a second UE can transmit DMRSs in OFDM symbol #0 and data in OFDM symbol #6. The DMRSs for different UEs can be orthogonal based on sequence property. In such a way, PAPR (Peak to Average Power Ratio) is small since there is no multiplexing between data and RSs in the same OFDM symbol. In addition, this embodiment also keeps latency reduction gain and reduces RS overhead.

Alternatively, the first type of RSs (DMRSs in this embodiment) can be always mapped onto any other OFDM symbol of the subframe while preserving the above benefits. For example, the DMRSs can be always mapped onto a middle OFDM symbol (for example, symbol #6 or #7) such that the demodulation performance can be further improved.

Figure 11:
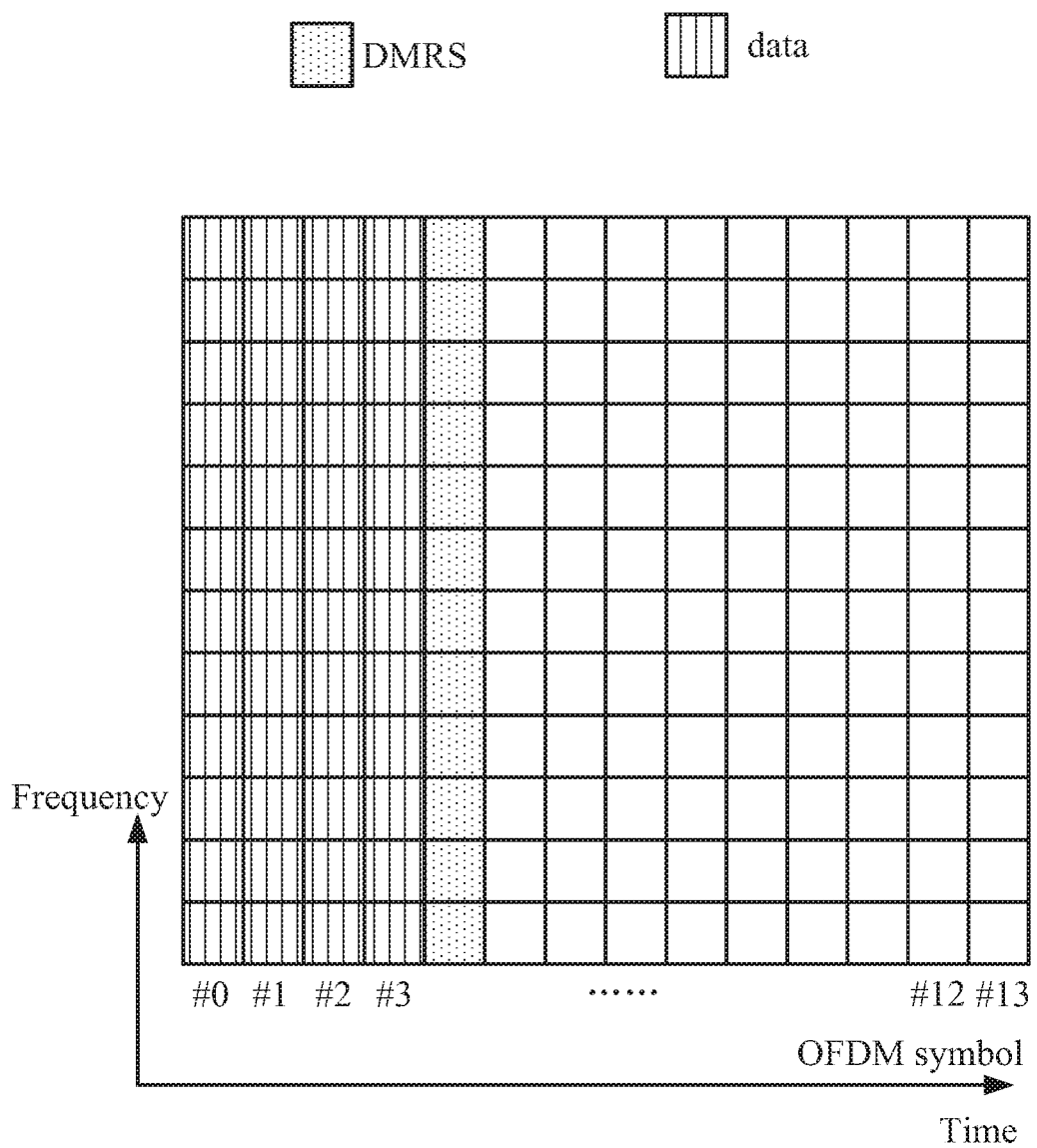
FIG. 11 schematically illustrates an exemplary uplink reference signal design according to an embodiment of the present disclosure.

Alternatively, for uplink, the first type of RSs associated with each shortened TTI can be mapped onto the OFDM symbol(s) adjacent to said shortened TTI. FIG. 11 schematically illustrates another exemplary uplink reference signal design according to an embodiment of the present disclosure. In this embodiment, it is assumed that the shortened TTI has four OFDM symbols. It can be seen from FIG. 11 that the OFDM symbol with the DMRSs is OFDM symbol #4 which is right after the shortened TTI in OFDM symbols #0-#3. In such a way, it is possible to further improve demodulation performance since DMRSs are closer to the shortened TTI to be demodulated.

Obviously, the OFDM symbol(s) for DMRSs can also be put right before its associated shortened TTI.

In another embodiment of the present disclosure, it is proposed that at most one type of RSs from CRSs and DMRSs in each TTI in a subframe, and the RSs within the OFDM symbol(s) of or before the shorten TTI transmitting a physical channel being used to demodulate the physical channel at a receiving side. In this embodiment, if a shortened TTI includes CRSs, it will not include DMRSs, and the shortened TTI can be demodulated by the CRSs in it. If a shortened TTI includes DMRSs, it will not include CRSs, and the shortened TTI can be demodulated by the DMRSs in it. If a shortened TTI includes none of DMRSs and CRSs, the shortened TTI can be demodulated by RSs (DMRSs or CRSs) in other OFDM symbol(s) before the shorten TTI. In addition, some CRSs and some DMRSs in the subframe can be jointly used to demodulate a shortened TTI.

Figure 12:
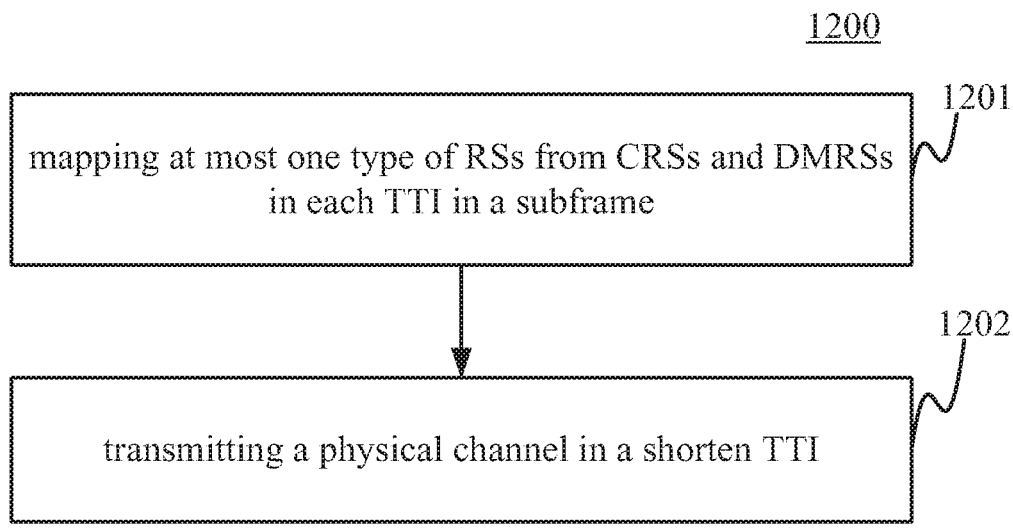
FIG. 12 illustrates a flowchart of a wireless communication method according to an embodiment of the present disclosure.

Accordingly, an embodiment of the present disclosure provides a wireless communication device comprising: circuitry operative to map at most one type of RSs from CRSs and DMRSs in each shorten TTI in a subframe; and a transmitter operative to transmit a physical channel in a shorten TTI, the RSs within the OFDM symbol(s) of or before the shorten TTI transmitting the physical channel being used to demodulate the physical channel at a receiving side. The structure of the wireless communication device in this embodiment is similar to the structure shown in FIG. 2, which will not be repeated here. It is noted that the transmission in this embodiment is usually a downlink transmission, and the wireless communication device can be an eNB or the like. FIG. 12 illustrates a flowchart of a wireless communication method 1200 performed by the above wireless communication device according to an embodiment of the present disclosure. The method 1200 can comprise a step 1201 of mapping at most one type of RSs from CRSs and DMRSs in each shorten TTI in a subframe; and a step 1202 of transmitting a physical channel in a shorten TTI, the RSs within the OFDM symbol(s) of or before the shorten TTI transmitting the physical channel being used to demodulate the physical channel at a receiving side.

Figure 13:
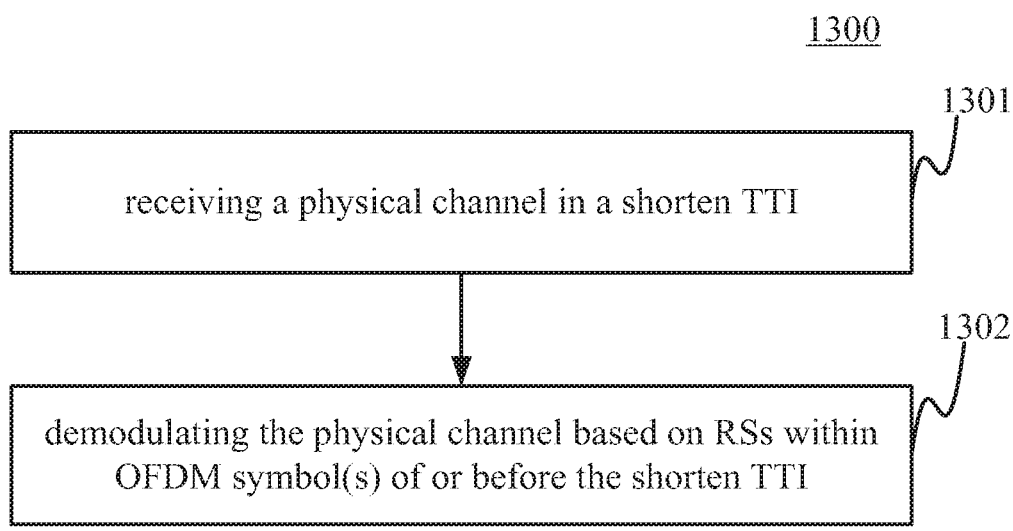
FIG. 13 illustrates a flowchart of a wireless communication method according to an embodiment of the present disclosure.

At a receiving side, embodiments of the present disclosure provide a wireless communication method and a wireless communication device performing the method at the receiving side. It is noted that, referring to the transmission side, the communication device at the receiving side can be a UE or the like. FIG. 13 illustrates a flowchart of a wireless communication method 1300 at the receiving side according to an embodiment of the present disclosure. The method 1300 comprises: a step 1301 of receiving a physical channel in a shorten TTI; and a step 1302 of demodulating the physical channel based on RSs within OFDM symbol(s) of or before the shorten TTI, wherein at most one type of RSs from CRSs and DMRSs are mapped in each shorten TTI in a subframe, and each shortened TTI comprises 1-7 OFDM symbols. Accordingly, a wireless communication device at the receiving side can comprise: a receiver operative to receive a physical channel in a shorten TTI; and circuitry operative to demodulate the physical channel based on RSs within OFDM symbol(s) of or before the shorten TTI, wherein at most one type of RSs from CRSs and DMRSs are mapped in each shorten TTI in a subframe, and each shortened TTI comprises 1-7 OFDM symbols. It is noted the above details on the transmission side can also be applied to the receiving side unless the context indicates otherwise. In particular, the schematic structure of the wireless communication device at the receiving side can be similar to FIG. 2 except that the transmitter 202 is replaced by the receiver.

In the following, several specific instances related to the above embodiments will be described in detail in order to make the present disclosure be easily understood by those skilled in the art.

Figure 14:
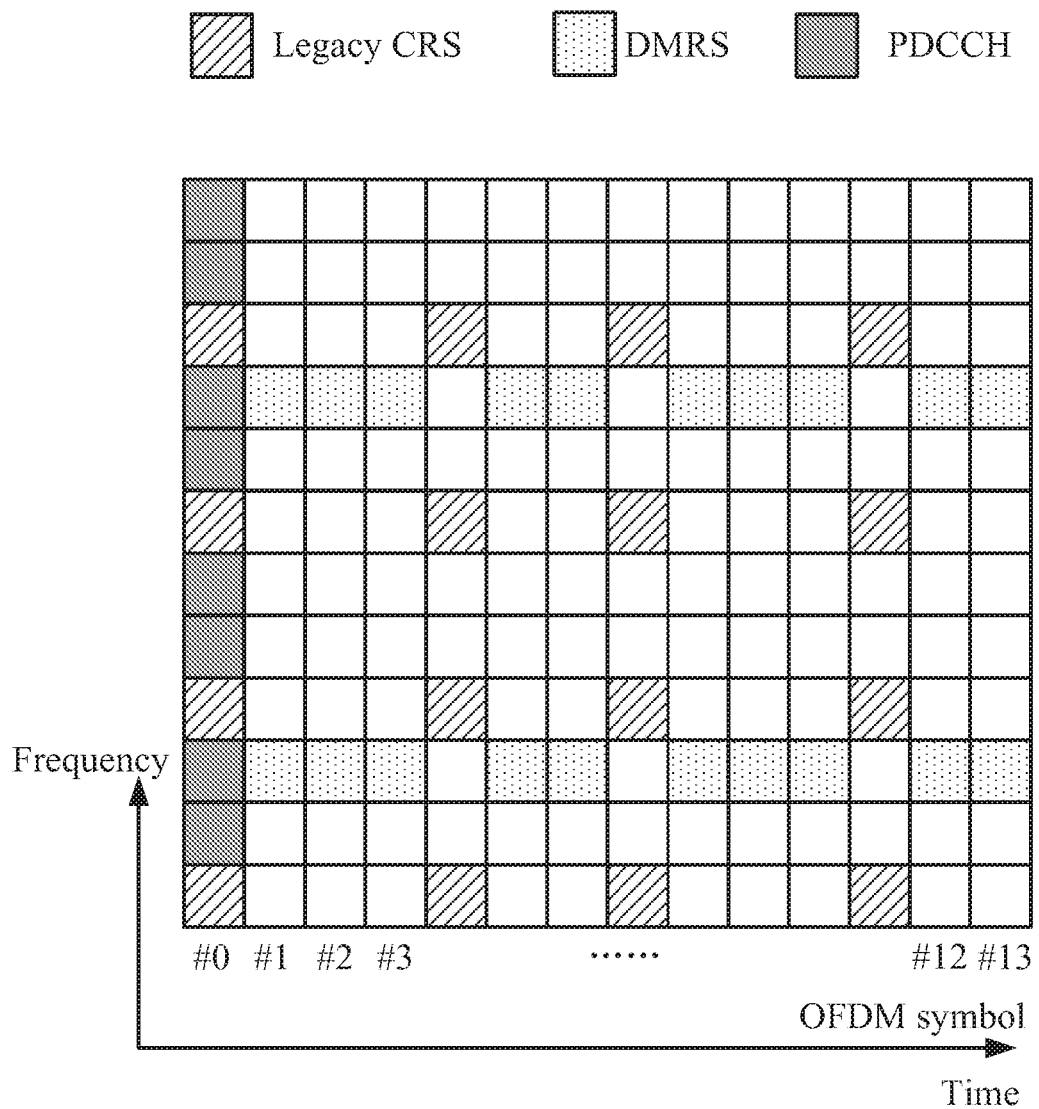
FIG. 14 schematically illustrates an exemplary downlink reference signal design according to an embodiment of the present disclosure.

In one embodiment, either CRSs or DMRSs are mapped in each shorten TTI, and the CRSs or DMRSs in the shorten TTI transmitting the physical channel is used to demodulate the physical channel. FIG. 14 schematically illustrates an exemplary downlink reference signal design according to the embodiment of the present disclosure. In this embodiment, it is assumed that the length of the shortened TTI is one OFDM symbol, and legacy CRSs are used. It can be seen that the shortened TTIs that have legacy CRSs do not include DMRSs, and those shortened TTIs that do not have legacy CRSs include DMRSs. In this case, different shortened TTIs use different types of RSs for demodulation. The shortened TTIs which only include CRSs will use CRSs for demodulation, and the shortened TTIs which only include DMRS will use DMRSs for demodulation. Different shortened TTIs may use different transmission schemes for demodulation. The benefit of such an approach is that the RS overhead can be further reduced since DMRSs are not transmitted in some OFDM symbols.

Figure 15:
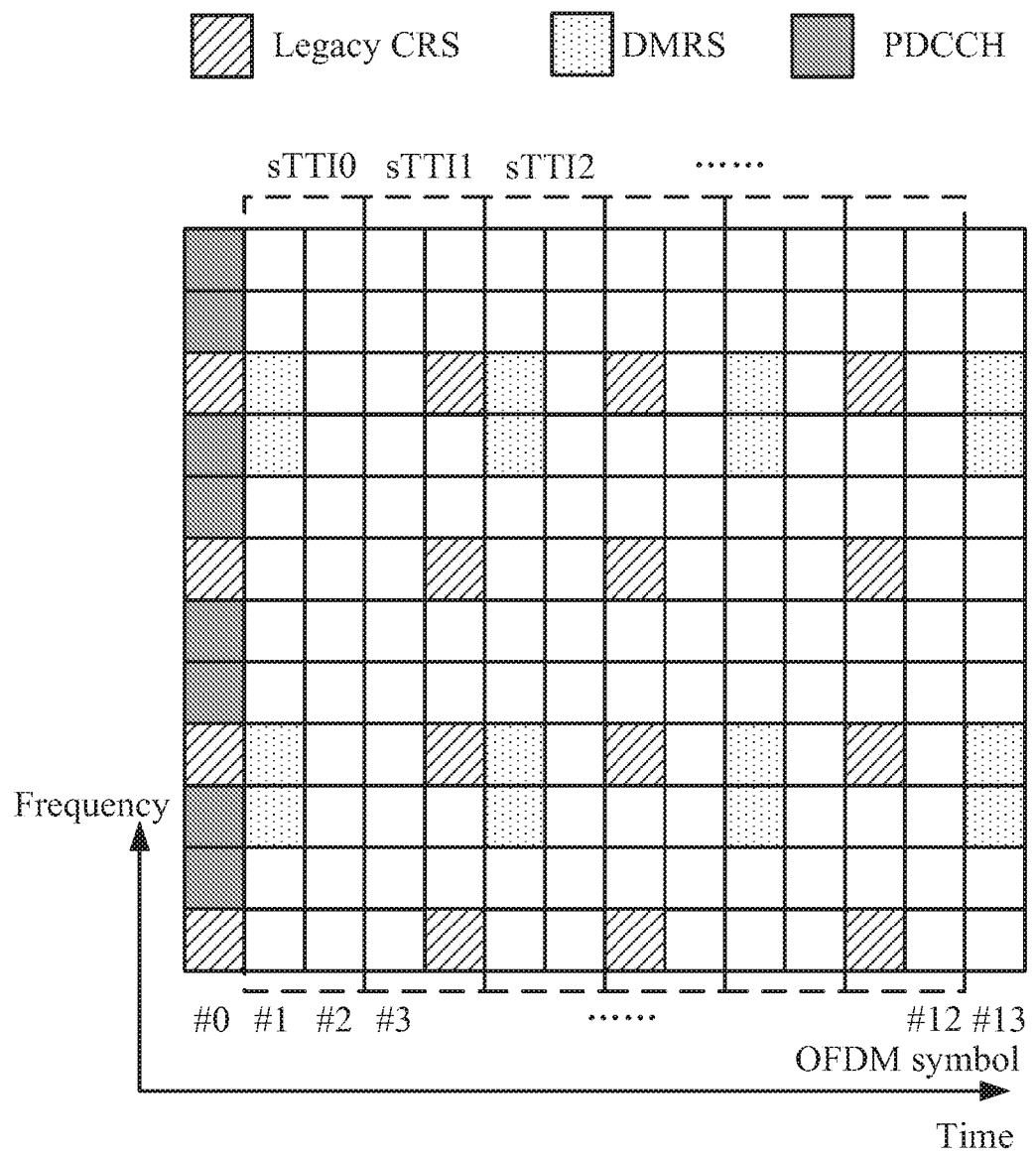
FIG. 15 schematically illustrates an exemplary downlink reference signal design according to an embodiment of the present disclosure.

FIG. 15 schematically illustrates another exemplary downlink reference signal design according to the embodiment of the present disclosure. The difference between FIG. 15 and FIG. 14 is that the length of the shortened TTIs is 2 OFDM symbols in FIG. 15, and thus the DMRSs are not necessarily transmitted in every OFDM symbol of the shortened TTI without CRSs. Obviously, the DMRSs can also be transmitted in every OFDM symbol of the shortened TTI without CRSs. Similar to FIG. 14, the RS overhead can be reduced.

Figure 16:
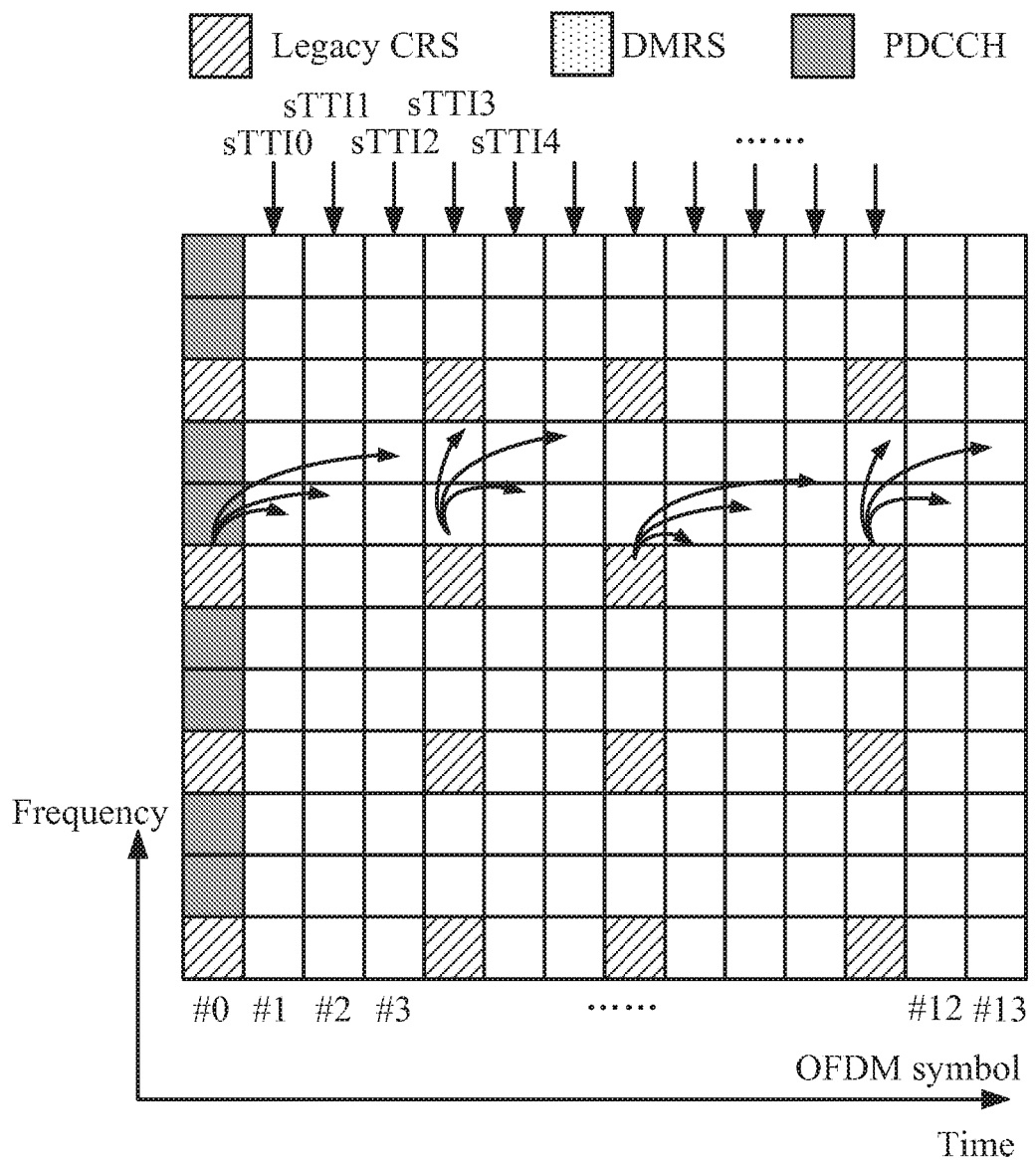
FIG. 16 schematically illustrates an exemplary downlink reference signal design according to the embodiment of the present disclosure.

In another embodiment, CRSs are mapped in some shorten TTIs; neither CRSs nor DMRSs are mapped in the other shorten TTIs; and the CRSs in one OFDM symbol are used to demodulate multiple OFDM symbols which are not earlier than said one OFDM symbol, or all CRSs that are not later than each shorten TTI are used to demodulate said shorten TTI. FIG. 16 schematically illustrates an exemplary downlink reference signal design according to the embodiment of the present disclosure. In this embodiment, it is assumed that the length of the shortened TTI is one OFDM symbol, and legacy CRSs are used. It can be seen that no DMRSs are transmitted, and a shortened TTI without RSs can be demodulated by CRSs in one nearest OFDM symbol before said shortened TTI or can be demodulated by all CRSs that are not later than said shortened TTI. In such a manner, RS overhead can be largely reduced and latency reduction gain can be guaranteed.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A wireless communication device comprising:
  circuitry operative to map at least a first type of reference signals (RSs) onto orthogonal frequency division multiplexing (OFDM) symbol(s) other than the OFDM symbols onto which shortened transmission time intervals (TTIs) are mapped in a subframe, each of the shortened TTIs comprising 1-7 OFDM symbols; and
  a transmitter operative to transmit a physical channel in one of the shortened TTIs and transmit at least the first type of RSs.

(2). The wireless communication device according to (1), wherein same OFDM symbol(s) are shared by multiple shortened TTIs to map their associated RSs of the first type.

(3). The wireless communication device according to any of (1)-(2), wherein each shortened TTI is placed after the OFDM symbol(s) with the first type of RSs associated with said shortened TTI.

(4). The wireless communication device according to any of (1)-(3), wherein two or more OFDM symbols in the subframe are used to map the first type of RSs; and
the two or more OFDM symbols are spaced from each other.

(5). The wireless communication device according to any of (1)-(4), wherein the position of the OFDM symbol(s) to transmit the first type of RSs depends on the length of the physical downlink control channel (PDCCH) region in the subframe.

(6). The wireless communication device according to any of (2)-(5), wherein
the first type of RSs are demodulation reference signals (DMRSs); and
the DMRSs in the OFDM symbol(s) shared by the multiple shortened TTIs are used to multiplex multiple DMRS ports each of which is associated with one or more of the multiple shortened TTIs.

(7). The wireless communication device according to (6), wherein
the position and/or the usage of the DMRS ports are indicated in downlink channel information (DCI) transmitted in a physical downlink control channel (PDCCH).

(8). The wireless communication device according to (6), wherein
the position and the usage of the DMRS ports are fixed by specification or configured by the medium access control (MAC) or radio resource control (RRC) layer.

(9). The wireless communication device according to (6), wherein
the position of the DMRS ports is fixed by specification or configured by the MAC or RRC layer;
DCI is transmitted in a shortened TTI whose associated DMRS port is fixed by specification or configured by MAC or RRC layer; and
the usage of the DMRS ports other than the DMRS port that is associated with the DCI is indicated in the DCI.

(10). The wireless communication device according to any of (1)-(9), wherein
the first type of RSs are demodulation reference signals (DMRSs); and
a second type of RSs which are channel status information-reference signals (CSI-RSs) are mapped onto the same OFDM symbol(s) as the DMRSs.

(11). The wireless communication device according to any of (1)-(4), wherein
the transmission performed by the transmitter is uplink transmission; and
the first type of RSs are always mapped onto the start OFDM symbol of the subframe.

(12). The wireless communication device according to any of (1)-(4), wherein
the transmission performed by the transmitter is uplink transmission; and
the first type of RSs associated with each shortened TTI are mapped onto the OFDM symbol(s) adjacent to said shortened TTI.

(13). A wireless communication method comprising:
mapping at least a first type of reference signals (RSs) onto orthogonal frequency division multiplexing (OFDM) symbol(s) other than the OFDM symbols onto which shortened transmission time intervals (TTIs) are mapped in a subframe, each of the shortened TTIs comprising 1-7 OFDM symbols; and
transmitting a physical channel in one of the shortened TTIs and transmitting at least the first type of RSs.

(14). The wireless communication method according to (13), wherein
same OFDM symbol(s) are shared by multiple shortened TTIs to map their associated RSs of the first type.

(15). The wireless communication method according to any of (13)-(14), wherein
each shortened TTI is placed after the OFDM symbol(s) with the first type of RSs associated with said shortened TTI.

(16). The wireless communication method according to any of (13)-(15), wherein
two or more OFDM symbols in the subframe are used to map the first type of RSs; and
the two or more OFDM symbols are spaced from each other.

(17). The wireless communication method according to any of (13)-(16), wherein the position of the OFDM symbol(s) to transmit the first type of RSs depends on the length of the physical downlink control channel (PDCCH) region in the subframe.

(18). The wireless communication method according to any of (14)-(17), wherein
the first type of RSs are demodulation reference signals (DMRSs); and
the DMRSs in the OFDM symbol(s) shared by the multiple shortened TTIs are used to multiplex multiple DMRS ports each of which is associated with one or more of the multiple shortened TTIs.

(19). The wireless communication method according to (18), wherein
the position and/or the usage of the DMRS ports are indicated in downlink channel information (DCI) transmitted in a physical downlink control channel (PDCCH).

(20). The wireless communication method according to (18), wherein
the position and the usage of the DMRS ports are fixed by specification or configured by the medium access control (MAC) or radio resource control (RRC) layer.

(21). The wireless communication method according to (18), wherein
the position of the DMRS ports is fixed by specification or configured by the MAC or RRC layer;
DCI is transmitted in a shortened TTI whose associated DMRS port is fixed by specification or configured by MAC or RRC layer; and
the usage of the DMRS ports other than the DMRS port that is associated with the DCI is indicated in the DCI.

(22). The wireless communication method according to any of (13)-(21), wherein
the first type of RSs are demodulation reference signals (DMRSs); and
a second type of RSs which are channel status information-reference signals (CSI-RSs) are mapped onto the same OFDM symbol(s) as the DMRSs.

(23). The wireless communication method according to any of (13)-(16), wherein
the transmission is uplink transmission; and
the first type of RSs are always mapped onto the start OFDM symbol of the subframe.

(24). The wireless communication method according to any of (13)-(16), wherein
the transmission is uplink transmission; and
the first type of RSs associated with each shortened TTI are mapped onto the OFDM symbol(s) adjacent to said shortened TTI.

(25). A wireless communication device comprising:
a receiver operative to receive at least a first type of reference signals (RSs) and receive a physical channel in a shortened transmission time interval (TTI) which comprises 1-7 orthogonal frequency division multiplexing (OFDM) symbols; and
circuitry operative to demodulate the physical channel based on at least the first type of RSs, wherein
the first type of RSs are mapped onto OFDM symbol(s) onto which no shortened TTIs are mapped.

(26). The wireless communication device according to (25), wherein
same OFDM symbol(s) are shared by multiple shortened TTIs to map their associated RSs of the first type.

(27). The wireless communication device according to any of (25)-(26), wherein
each shortened TTI is placed after the OFDM symbol(s) with the first type of RSs associated with said shortened TTI.

(28). The wireless communication device according to any of (25)-(27), wherein
two or more OFDM symbols in the subframe are used to map the first type of RSs; and
the two or more OFDM symbols are spaced from each other.

(29). The wireless communication device according to any of (25)-(28), wherein the position of the OFDM symbol(s) to map the first type of RSs depends on the length of the physical downlink control channel (PDCCH) region in the subframe.

(30). The wireless communication device according to any of (26)-(29), wherein
the first type of RSs are demodulation reference signals (DMRSs); and
the DMRSs in the OFDM symbol(s) shared by the multiple shortened TTIs are used to multiplex multiple DMRS ports each of which is associated with one or more of the multiple shortened TTIs.

(31). The wireless communication device according to (30), wherein
the position and/or the usage of the DMRS ports are indicated in downlink channel information (DCI) transmitted in a physical downlink control channel (PDCCH).

(32). The wireless communication device according to (30), wherein
the position and the usage of the DMRS ports are fixed by specification or configured by the medium access control (MAC) or radio resource control (RRC) layer.

(33). The wireless communication device according to (30), wherein
the position of the DMRS ports is fixed by specification or configured by the MAC or RRC layer;
DCI is transmitted in a shortened TTI whose associated DMRS port is fixed by specification or configured by MAC or RRC layer; and
the usage of the DMRS ports other than the DMRS port that is associated with the DCI is indicated in the DCI.

(34). The wireless communication device according to any of (25)-(33), wherein
the first type of RSs are demodulation reference signals (DMRSs); and
a second type of RSs which are channel status information-reference signals (CSI-RSs) are mapped onto the same OFDM symbol(s) as the DMRSs.

(35). The wireless communication device according to any of (25)-(28), wherein
the receiving is in uplink; and
the first type of RSs are always mapped onto the start OFDM symbol of the subframe.

(36). The wireless communication device according to any of (25)-(28), wherein
the receiving is in uplink; and
the first type of RSs associated with each shortened TTI are mapped onto the OFDM symbol(s) adjacent to said shortened TTI.

(37). A wireless communication method comprising:
receiving at least a first type of reference signals (RSs) and receiving a physical channel in a shortened transmission time interval (TTI) which comprises 1-7 orthogonal frequency division multiplexing (OFDM) symbols; and
demodulating the physical channel based on at least the first type of RSs, wherein
the first type of RSs are mapped onto OFDM symbol(s) onto which no shortened TTIs are mapped.

(38). The wireless communication method according to (37), wherein
same OFDM symbol(s) are shared by multiple shortened TTIs to map their associated RSs of the first type.

(39). The wireless communication method according to any of (37)-(38), wherein
each shortened TTI is placed after the OFDM symbol(s) with the first type of RSs associated with said shortened TTI.

(40). The wireless communication method according to any of (37)-(39), wherein
two or more OFDM symbols in the subframe are used to map the first type of RSs; and
the two or more OFDM symbols are spaced from each other.

(41). The wireless communication method according to any of (37)-(40), wherein the position of the OFDM symbol(s) to map the first type of RSs depends on the length of the physical downlink control channel (PDCCH) region in the subframe.

(42). The wireless communication method according to any of (37)-(41), wherein
the first type of RSs are demodulation reference signals (DMRSs); and
the DMRSs in the OFDM symbol(s) shared by the multiple shortened TTIs are used to multiplex multiple DMRS ports each of which is associated with one or more of the multiple shortened TTIs.

(43). The wireless communication method according to (42), wherein
the position and/or the usage of the DMRS ports are indicated in downlink channel information (DCI) transmitted in a physical downlink control channel (PDCCH).

(44). The wireless communication method according to (42), wherein
the position and the usage of the DMRS ports are fixed by specification or configured by the medium access control (MAC) or radio resource control (RRC) layer.

(45). The wireless communication method according to (42), wherein
the position of the DMRS ports is fixed by specification or configured by the MAC or RRC layer;
DCI is transmitted in a shortened TTI whose associated DMRS port is fixed by specification or configured by MAC or RRC layer; and
the usage of the DMRS ports other than the DMRS port that is associated with the DCI is indicated in the DCI.

(46). The wireless communication method according to any of (37)-(45), wherein
the first type of RSs are demodulation reference signals (DMRSs); and
a second type of RSs which are channel status information-reference signals (CSI-RSs) are mapped onto the same OFDM symbol(s) as the DMRSs.

(47). The wireless communication method according to any of (37)-(40), wherein
the receiving is in uplink; and
the first type of RSs are always mapped onto the start OFDM symbol of the subframe.

(48). The wireless communication method according to any of (37)-(40), wherein
the receiving is in uplink; and
the first type of RSs associated with each shortened TTI are mapped onto the OFDM symbol(s) adjacent to said shortened TTI.

(49). A wireless communication device comprising:
circuitry operative to map at most one type of reference signals (RSs) from cell-specific reference signals (CRSs) and demodulation reference signals (DMRSs) in each shorten transmission time interval (TTI) in a subframe, each shortened TTI comprising 1-7 orthogonal frequency division multiplexing (OFDM) symbols; and
a transmitter operative to transmit a physical channel in a shorten TTI, the RSs within the OFDM symbol(s) of or before the shorten TTI transmitting the physical channel being used to demodulate the physical channel at a receiving side.

(50). The wireless communication device according to (49), wherein
either CRSs or DMRSs are mapped in each shorten TTI, and
the CRSs or DMRSs in the shorten TTI transmitting the physical channel is used to demodulate the physical channel.

(51). The wireless communication device according to (49), wherein
CRSs are mapped in some shorten TTIs;
neither CRSs nor DMRSs are mapped in the other shorten TTIs; and
the CRSs in one OFDM symbol are used to demodulate multiple OFDM symbols which are not earlier than said one OFDM symbol, or all CRSs that are not later than each shorten TTI are used to demodulate said shorten TTI.

(52). A wireless communication method comprising:
mapping at most one type of reference signals (RSs) from cell-specific reference signals (CRSs) and demodulation reference signals (DMRSs) in each shorten transmission time interval (TTI) in a subframe, each shortened TTI comprising 1-7 orthogonal frequency division multiplexing (OFDM) symbols; and
transmitting a physical channel in a shorten TTI, the RSs within the OFDM symbol(s) of or before the shorten TTI transmitting the physical channel being used to demodulate the physical channel at a receiving side.

(53). The wireless communication method according to (52), wherein
either CRSs or DMRSs are mapped in each shorten TTI, and
the CRSs or DMRSs in the shorten TTI transmitting the physical channel is used to demodulate the physical channel.

(54). The wireless communication method according to (52), wherein
CRSs are mapped in some shorten TTIs;
neither CRSs nor DMRSs are mapped in the other shorten TTIs; and
the CRSs in one OFDM symbol are used to demodulate multiple OFDM symbols which are not earlier than said one OFDM symbol, or all CRSs that are not later than each shorten TTI are used to demodulate said shorten TTI.

(55). A wireless communication device comprising:
a receiver operative to receive a physical channel in a shorten transmission time interval (TTI); and
circuitry operative to demodulate the physical channel based on reference signals (RSs) within orthogonal frequency division multiplexing (OFDM) symbol(s) of or before the shorten TTI, wherein
at most one type of RSs from cell-specific reference signals (CRSs) and demodulation reference signals (DMRSs) are mapped in each shorten TTI in a subframe, and each shortened TTI comprises 1-7 OFDM symbols.

(56). The wireless communication device according to (55), wherein
either CRSs or DMRSs are mapped in each shorten TTI, and
the CRSs or DMRSs in the shorten TTI transmitting the physical channel is used to demodulate the physical channel.

(57). The wireless communication device according to (55), wherein
CRSs are mapped in some shorten TTIs;
neither CRSs nor DMRSs are mapped in the other shorten TTIs; and
the CRSs in one OFDM symbol are used to demodulate multiple OFDM symbols which are not earlier than said one OFDM symbol, or all CRSs that are not later than each shorten TTI are used to demodulate said shorten TTI.

(58). A wireless communication method comprising:
receiving a physical channel in a shorten transmission time interval (TTI); and
demodulating the physical channel based on reference signals (RSs) within orthogonal frequency division multiplexing (OFDM) symbol(s) of or before the shorten TTI, wherein
at most one type of RSs from cell-specific reference signals (CRSs) and demodulation reference signals (DMRSs) are mapped in each shorten TTI in a subframe, and each shortened TTI comprises 1-7 OFDM symbols.

(59). The wireless communication method according to (58), wherein
either CRSs or DMRSs are mapped in each shorten TTI, and
the CRSs or DMRSs in the shorten TTI transmitting the physical channel is used to demodulate the physical channel.

(60). The wireless communication method according to (58), wherein
CRSs are mapped in some shorten TTIs;
neither CRSs nor DMRSs are mapped in the other shorten TTIs; and
the CRSs in one OFDM symbol are used to demodulate multiple OFDM symbols which are not earlier than said one OFDM symbol, or all CRSs that are not later than each shorten TTI are used to demodulate said shorten TTI.

In addition, embodiments of the present disclosure can also provide an integrated circuit which comprises module(s) for performing the step(s) in the above respective communication methods. Further, embodiments of the present can also provide a computer readable storage medium having stored thereon a computer program containing a program code which, when executed on a computing device, performs the step(s) of the above respective communication methods.

The invention claimed is:

1. A communication apparatus, comprising:
   circuitry, which, in operation, maps a reference signal (RS) and a physical channel to a first one of a plurality of subgroups; and
   a transmitter, which is coupled to the circuitry and which, in operation, transmits the mapped RS and the mapped physical channel in the first one of the plurality of subgroups;
   wherein none of RSs are mapped to a second one of the plurality of subgroups and a third one of the plurality of subgroups, wherein the first one of the plurality of subgroups is assigned between the second one of the plurality of subgroups and the third one of the plurality of subgroups, and wherein a number of subgroups of the plurality of subgroups between adjacent subgroups of the plurality of subgroups, having a first type of RS, differs within a subframe comprising the plurality of subgroups.

2. The communication apparatus according to claim 1, wherein the RS mapped on a symbol is used for some or all of the plurality of subgroups.

3. The communication apparatus according to claim 1, wherein a position of the RS is indicated by downlink control information (DCI).

4. The communication apparatus according to claim 1, wherein RS port numbers are indicated by Radio Resource Control (RRC) signaling.

5. The communication apparatus according to claim 1, wherein the physical channel is mapped after the RS.

6. The communication apparatus according to claim 1, wherein the first type of RS is a demodulation reference signal (DMRS).

7. A communication method, comprising:
   mapping a reference signal (RS) and a physical channel to a first one of a plurality of subgroups; and
   transmitting the mapped RS and the mapped physical channel in the first one of the plurality of subgroups;
   wherein none of RSs are mapped to a second one of the plurality of subgroups and a third one of the plurality of subgroups, wherein the first one of the plurality of subgroups is assigned between the second one of the plurality of subgroups and the third one of the plurality of subgroups, and wherein a number of subgroups of the plurality of subgroups between adjacent subgroups of the plurality of subgroups, having a first type of RS, differs within a subframe comprising the plurality of subgroups.

8. The communication method according to claim 7, wherein the RS mapped on a symbol is used for some or all of the plurality of subgroups.

9. The communication method according to claim 7, wherein a position of the RS is indicated by downlink control information (DCI).

10. The communication method according to claim 7, wherein RS port numbers are indicated by Radio Resource Control (RRC) signaling.

11. The communication method according to claim 7, wherein the physical channel is mapped after the RS.

12. The communication method according to claim 7, wherein the first type of RS is a demodulation reference signal (DMRS).

* * * * *